(No Model.)
E. TECKTONIUS & J. N. BASHAW.
SEAT SPRING.
No. 262,708. Patented Aug. 15, 1882.
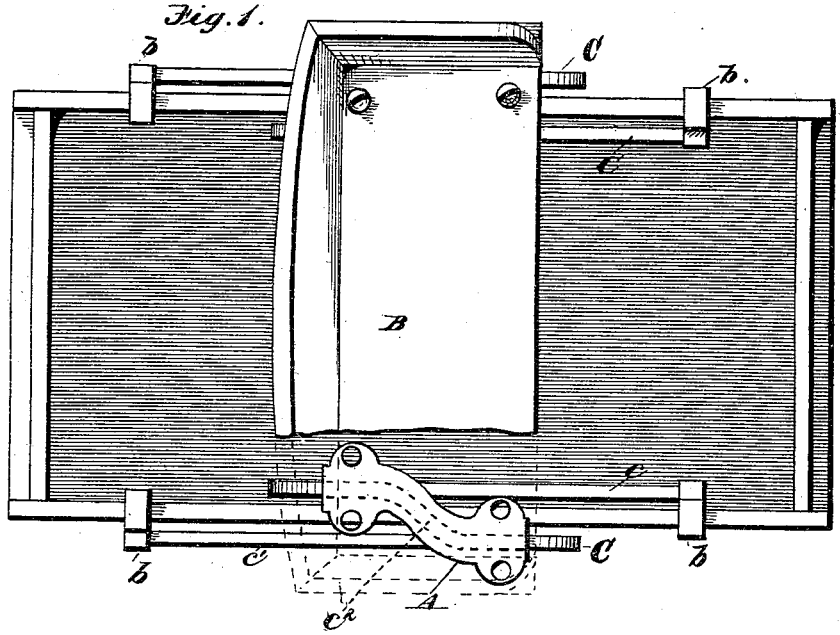
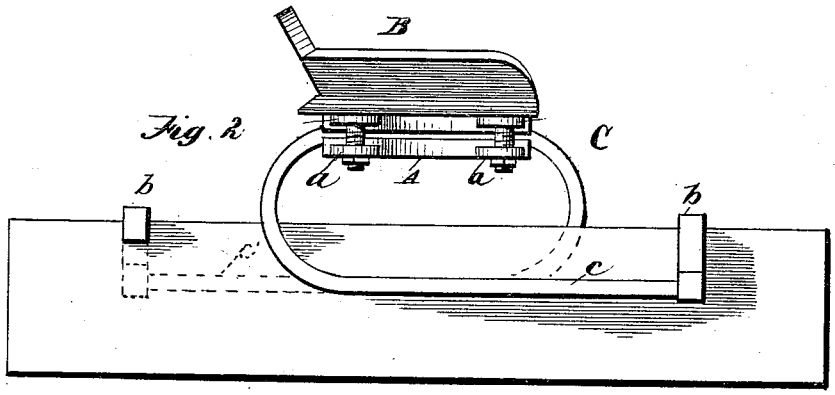
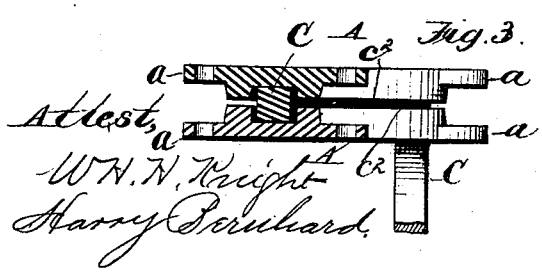

UNITED STATES PATENT OFFICE.

EMIL TECKTONIUS AND JOHN N. BASHAW, OF KENOSHA, WISCONSIN.

SEAT-SPRING.

SPECIFICATION forming part of Letters Patent No. 262,708, dated August 15, 1882.

Application filed March 2, 1882. (No model.)

*To all whom it may concern:*

Be it known that we, EMIL TECKTONIUS and JOHN N. BASHAW, citizens of the United States, residing at Kenosha, in the county of Kenosha and State of Wisconsin, have invented certain new and useful Improvements in Seat-Springs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a plan view, with the seat partly broken away, of our improvement in vehicle spring-seats. Fig. 2 is a side view, and Figs. 3 and 4 are detailed views thereof.

This invention has relation to an improvement in vehicle spring-seats, its object being to permit of the distribution of the weight of the occupant and to increase the strength of the springs without impairing their resiliency, and to enable the ready and secure fastening or connecting of the seat upon its springs; and it consists in the construction of the springs and of a socket or bracket composed of two parts suitably bolted together and adapted to connect the seat to the springs, substantially as hereinafter more fully set forth and claimed.

To put into practice our improvement we employ two springs, C, each having a forward horizontally-extending arm, $c$, and a rearward-extending similarly-arranged arm, $c'$, disposed one out of line with the other, so that one will extend outside and the other inside of the vehicle-body, while they (the arms) are connected together by an upper, diagonal, or approximate S-shaped bar, $c^2$. This construction permits the distribution of the weight of the occupant of the seat and imparts to the spring greater strength without impairing its resiliency. The ends of the springs are each provided with a hook-shaped flange, $b$, as clearly seen in Fig. 4, to permit them to be readily and detachably connected to the sides of the vehicle-body.

A A are sockets or brackets to enable the mounting of the seat B upon the springs C. The sockets A are made each into two parts or halves, each half consisting of a plate grooved or recessed to form, as they are brought together, an inclosure for the upper part of the spring. They are adapted to conform to in order to receive the approximate S-shaped or diagonal upper portion of the springs, as clearly seen in Fig. 1. The parts or halves of each socket have ears or perforated flanges $a\ a$ at their ends to receive bolts to permit their being bolted to the seat, so as to be readily put together or taken apart, and bolted to or removed from the seat and springs.

This form of spring is adapted for either heavy or farmers' wagons or light vehicles.

We claim and desire to secure by Letters Patent—

1. The spring for vehicle-seats, composed of two arms, one arranged to extend on the outside and the other on the inside of the vehicle-body and connected to the seat by an approximate S-shaped or diagonal portion, substantially as and for the purpose set forth.

2. The seat socket or bracket composed of two parts, each part having a diagonal or curved groove, in combination with a spring-bar, substantially as and for the purpose set forth.

3. The single coiled spring, curved at the top of the coil to permit one arm to rest on the outside and the other arm on the inside of the box or body of a vehicle, in combination with means for attaching and supporting a seat, as and for the purpose set forth.

4. The single coiled spring, curved substantially as shown, to permit one arm to rest on the inside and the other arm on the outside of the box or body of the vehicle by means of two hooks, one curved to the right and the other one to the left, as and for the purpose specified.

In testimony whereof we affix our signatures in presence of two witnesses.

EMIL TECKTONIUS.
JOHN N. BASHAW.

Witnesses:
JNO. W. HAYES,
J. A. GALLAGHAN.